United States Patent
Watanabe

(10) Patent No.: US 7,853,986 B2
(45) Date of Patent: Dec. 14, 2010

(54) DOCUMENT DISTRIBUTION SYSTEM AND METHOD

(75) Inventor: Ryutaro Watanabe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 979 days.

(21) Appl. No.: 11/504,607

(22) Filed: Aug. 16, 2006

(65) Prior Publication Data

US 2007/0050368 A1    Mar. 1, 2007

(30) Foreign Application Priority Data

Aug. 24, 2005    (JP)    ............................. 2005-243062

(51) Int. Cl.
G06F 7/04    (2006.01)
H04L 9/32    (2006.01)
(52) U.S. Cl. .......................................... 726/2; 713/168
(58) Field of Classification Search .................... 726/2; 713/168
See application file for complete search history.

(56) References Cited

U.S. PATENT DOCUMENTS

| | | | |
|---|---|---|---|
| 5,513,126 A * | 4/1996 | Harkins et al. ............... 709/228 |
| 6,609,115 B1 * | 8/2003 | Mehring et al. ............... 705/51 |
| 7,036,149 B2 * | 4/2006 | Sonoda et al. ................. 726/27 |
| 7,124,443 B2 | 10/2006 | Ishibashi et al. ............... 726/26 |
| 7,434,048 B1 * | 10/2008 | Shapiro et al. ............... 713/165 |
| 7,526,812 B2 * | 4/2009 | DeYoung ..................... 726/26 |
| 2001/0029531 A1 * | 10/2001 | Ohta .......................... 709/223 |
| 2002/0002589 A1 | 1/2002 | Yonenaga et al. ........... 709/206 |
| 2002/0013869 A1 * | 1/2002 | Taniguchi et al. ............. 710/33 |
| 2002/0077803 A1 | 6/2002 | Kudoh et al. .................... 704/1 |
| 2002/0138557 A1 * | 9/2002 | Mukaiyama et al. ........ 709/203 |
| 2003/0103528 A1 | 6/2003 | Kawaguchi et al. |
| 2003/0182475 A1 * | 9/2003 | Gimenez ....................... 710/8 |
| 2004/0267889 A1 | 12/2004 | Graham ....................... 709/206 |
| 2005/0021467 A1 * | 1/2005 | Franzdonk ..................... 705/51 |
| 2005/0044369 A1 * | 2/2005 | Anantharaman ............ 713/176 |
| 2005/0097061 A1 | 5/2005 | Shapiro et al. ................. 705/67 |

(Continued)

FOREIGN PATENT DOCUMENTS

EP    1 528 455    5/2005

(Continued)

OTHER PUBLICATIONS

Adobe Live Cycle Policy Server (internet web page: URL:http://www.indesignforum.com/gnu3/?doc=bbs/gnuboard.php&bo_table=news&page=9&wr_id=50).

(Continued)

Primary Examiner—Techane J. Gergiso
(74) Attorney, Agent, or Firm—Fitzpatrick, Cella, Harper & Scinto

(57) ABSTRACT

Even if a document file within a document management system has been transmitted outside the system by E-mail, a document management system maintains a document-file access rights equivalent to that within the document management system. The document distribution system distributes document files the access rights of which are managed by the document management system. The recipient of the document file is assumed to have access rights to the document file within the document management system. The document distribution system acquires policy information, which corresponds to these access rights, from a policy server. The document distribution system then transmits the acquired policy information and the document file to the recipient.

8 Claims, 11 Drawing Sheets

U.S. PATENT DOCUMENTS

| | | | |
|---|---|---|---|
| 2005/0097359 A1* | 5/2005 | Speare et al. | 713/201 |
| 2005/0154885 A1* | 7/2005 | Viscomi et al. | 713/165 |
| 2005/0171914 A1* | 8/2005 | Saitoh | 705/51 |
| 2005/0234859 A1* | 10/2005 | Ebata | 707/1 |
| 2005/0262572 A1* | 11/2005 | Yoneyama | 726/27 |
| 2005/0288939 A1* | 12/2005 | Peled et al. | 705/1 |
| 2006/0031923 A1* | 2/2006 | Kanai | 726/1 |

FOREIGN PATENT DOCUMENTS

| | | |
|---|---|---|
| JP | 10-049443 | 2/1998 |
| JP | 10-215242 | 8/1998 |
| JP | 2001-230768 | 8/2001 |
| JP | 2002-15264 A | 1/2002 |
| JP | 2002-117167 | 4/2002 |
| JP | 2002-342249 | 11/2002 |
| JP | 2003-178164 | 6/2003 |
| JP | 2004-302835 | 10/2004 |
| JP | 2005-141746 | 6/2005 |
| KR | 2001-0105163 A | 11/2001 |
| KR | 2005-0076840 A | 11/2007 |

OTHER PUBLICATIONS

Korean Office Action dated Sep. 6, 2007.

Sandhu R. S. et al: "Access Control: Principles and Practice" IEEE Communications Magazine, IEEE Service Center, New York, NY, US, vol. 32, No. 9, Sep. 1, 1994, pp. 40-48, XP000476554 ISSN: 0163-6804.

Japanese Office Action dated Jul. 17, 2009 in corresponding Japanese Application No. 2005-243062.

* cited by examiner

FIG. 5

| USER ID | USER ADDRESS |
|---------|--------------|
| User0001 | User1@XXX |
| User0002 | User2@XXX |
| ... | ... |

FIG. 6

| DOCUMENT ID | USER ID | READ | WRITE | PRINT |
|---|---|---|---|---|
| Doc0001 | User0001 | 1 (PERMITTED) | 0 (NOT PERMITTED) | 1 |
| Doc0001 | User0002 | 1 | 1 | 1 |

FIG. 7

| POLICY ID | USER ID | READ | WRITE | PRINT |
|---|---|---|---|---|
| P001 | User0001 | 1 (PERMITTED) | 0 (NOT PERMITTED) | 1 |
| P002 | User0001 | 1 | 1 | 1 |
| ... | ... | ... | ... | ... |
| P0101 | User0002 | 1 | 1 | 1 |
| P0102 | User0002 | 1 | 0 | 0 |

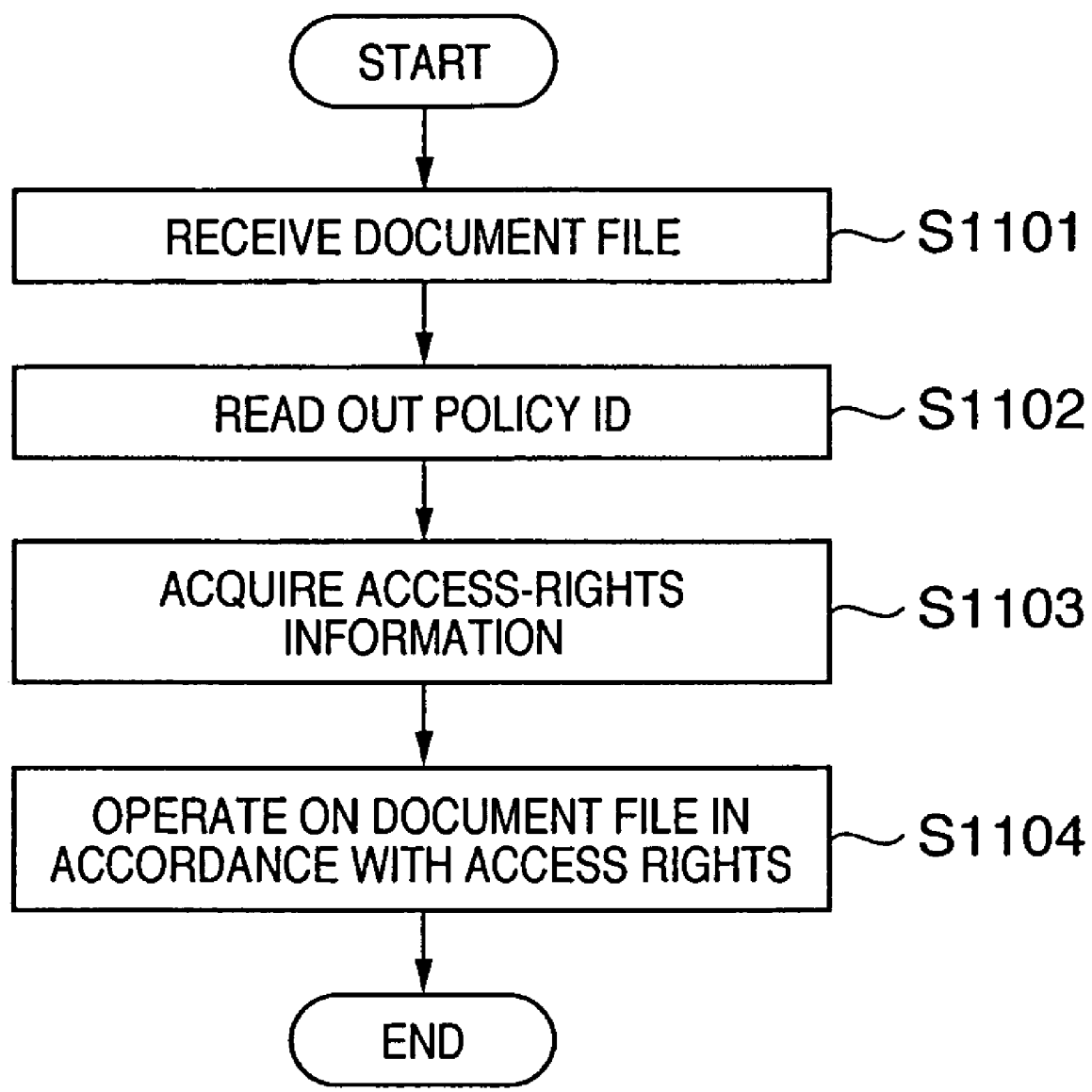

DOCUMENT DISTRIBUTION SYSTEM AND METHOD

BACKGROUND OF THE INVENTION

1. Field of the Invention

This invention relates to system and method for distributing document files in which the right to access the files is managed by a document management system.

2. Description of the Related Art

A document management system is a computer system in which the right to manipulate (right to access) electronic documents (document files) is managed on a per-user basis. For example, by storing a desired document file in a folder to which the access right has been restricted, a user to which access to the document file is not intended is prevented from accessing the document file.

When a document file is transmitted to multiple mail addresses, multiple copies of the document file are made and these are transmitted. It has been pointed out this imposes a heavy load upon the network. In accordance with the specification of Japanese Patent Application Laid-Open No. 2002-342249, a file sharing apparatus receives E-mail having an attached file and separates the attached file and E-mail from each other. The file sharing apparatus stores the attached file in a file server. The file sharing apparatus further makes an entry of link information, which is a link to the attached file, in the E-mail and transmits the E-mail. In addition, the file sharing apparatus allows access to the file only to users who correspond to the destination addresses of the E-mail. As a result, an attached file is shared with multiple users without copying it multiple times. This lightens the load upon the network.

Meanwhile, document distribution systems that that distribute documents based upon a policy have also been put into practical use. This document distribution system appends a policy, which is the identifier of an access right, and not the actual access right to a document. That is, the actual access right with respect to each policy is defined by a policy server. A user who has received the document is verified by the policy server and can acquire the actual access right that corresponds to the policy appended to the document.

If a document file being managed by a document management system is distributed by E-mail in the manner described above, there is the danger that the right to access the document file will be released to a user to whom such release is not intended.

Accordingly, it would be ideal if the above-described document management system and document distribution system could be operated in combination. However, the state of the art is such that a document management system and document distribution system cannot be simply integrated because they manage access rights using databases that differ from each other.

SUMMARY OF THE INVENTION

The present invention is a document distribution system for distributing document files to which access rights are managed by a document management system. First, the recipient of a document file is assumed to have an access right to the document file within the document management system. An acquisition unit acquires policy information, which corresponds to this access right, from a policy server. A transmitting unit then transmits the acquired policy information and the document file to the recipient.

In accordance with the present invention, policy information corresponding to the right to access a document file within a document management system can be appended to a document file and transmitted with the document file. This is advantageous in that even though the document file has been transmitted by E-mail, an access right equivalent to that within the document management system can be maintained.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the Invention.

FIG. 5 is a diagram illustrating an example of a user management table for correlating and managing user IDs and mail addresses in this embodiment;

FIG. 6 is a diagram illustrating an example of an access-right database according to this embodiment;

FIG. 7 is a diagram illustrating an example of a policy database according to this embodiment;

FIG. 11 is a flowchart illustrating processing by a client according to this embodiment.

DESCRIPTION OF THE EMBODIMENTS

Preferred embodiments of the present invention will now be described in detail in accordance with the accompanying drawings.

First Embodiment

Figure 1:
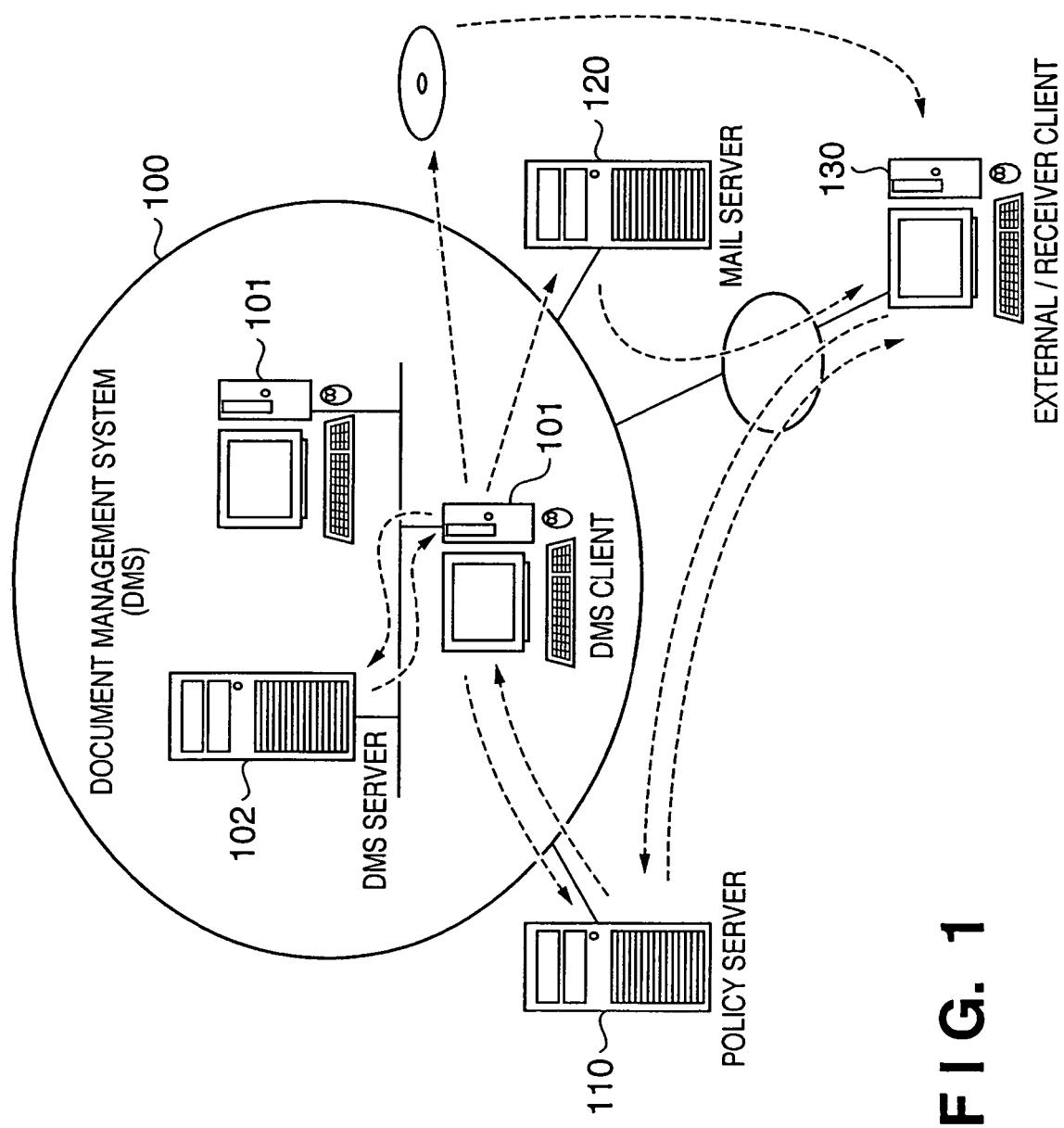
FIG. 1 is a diagram illustrating an example of the configuration of a document distribution system according to an embodiment of the present invention.

FIG. 1 is a diagram illustrating an example of the configuration of a document distribution system according to an embodiment of the present invention. The document distribution system includes a document management system (DMS) 100, a policy server 110, a mall server 120 and a client 130 at a distribution destination. The DMS 100 includes DMS clients 101 and a DMS server 102, etc. These units are interconnected by a network. The servers and clients are items of software (computer programs) that run on computers. A computer running a server program is referred to as a "server unit", and a computer running a client program is referred to as a "client unit".

Figure 2:
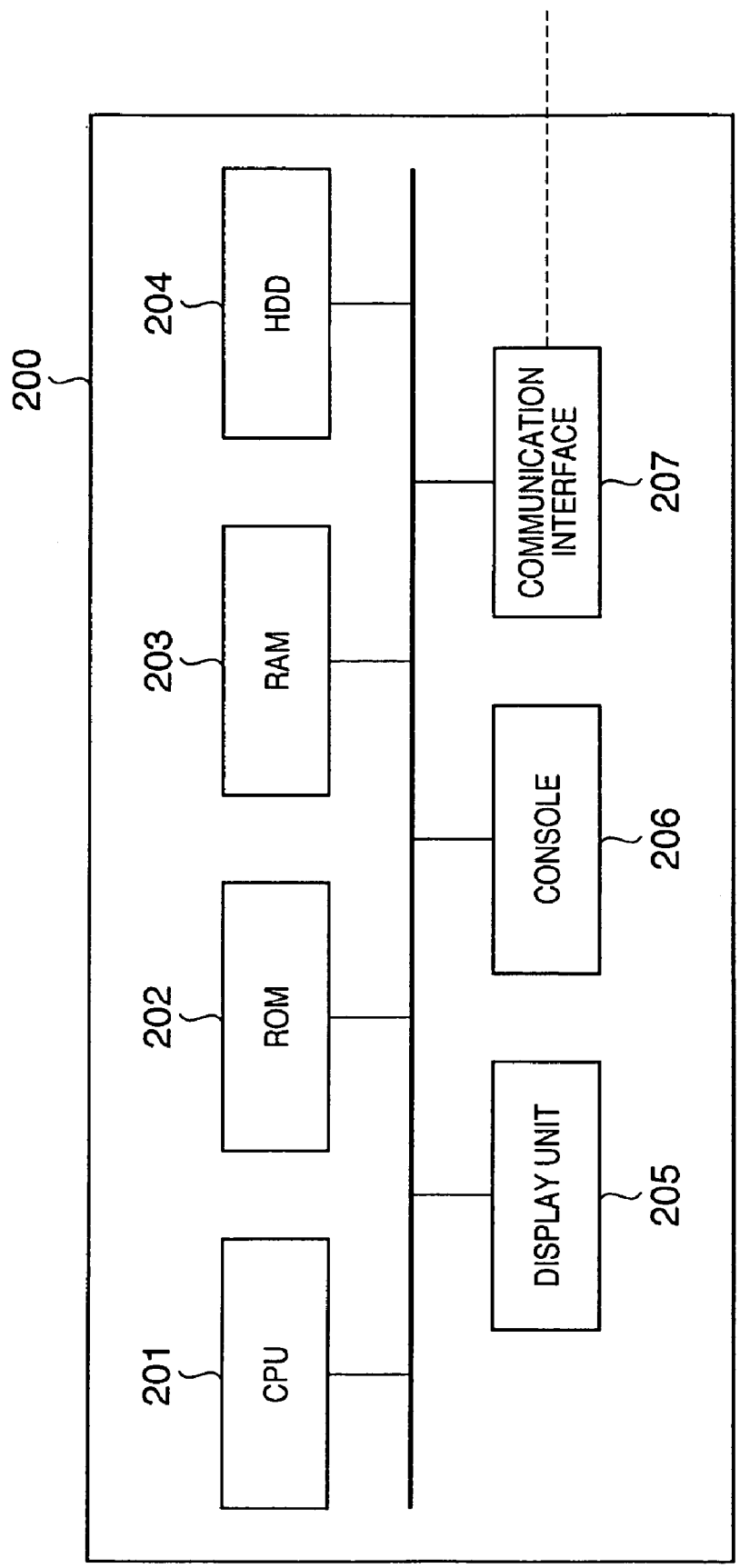
FIG. 2 is a diagram illustrating the basic structure of a computer according to this embodiment.

FIG. 2 is a diagram illustrating the basic structure of a computer 200 according to this embodiment. The computer 200 includes the following hardware units: A CPU 201 is a controller for performing overall control of the units of the computer. A ROM 202 is a non-volatile storage device for storing firmware and data, etc. A RAM 203 is a volatile storage device that functions as a work area. A hard-disk drive (HDD) 204 is a large-capacity storage device for storing an operating system, server and client programs and a database, etc. A display unit 205 is an output unit for outputting information visually. A console 206 is an input unit such as a keyboard and pointing device, etc. A communication interface circuit 207 is a communication device such as a network card.

Figure 3:
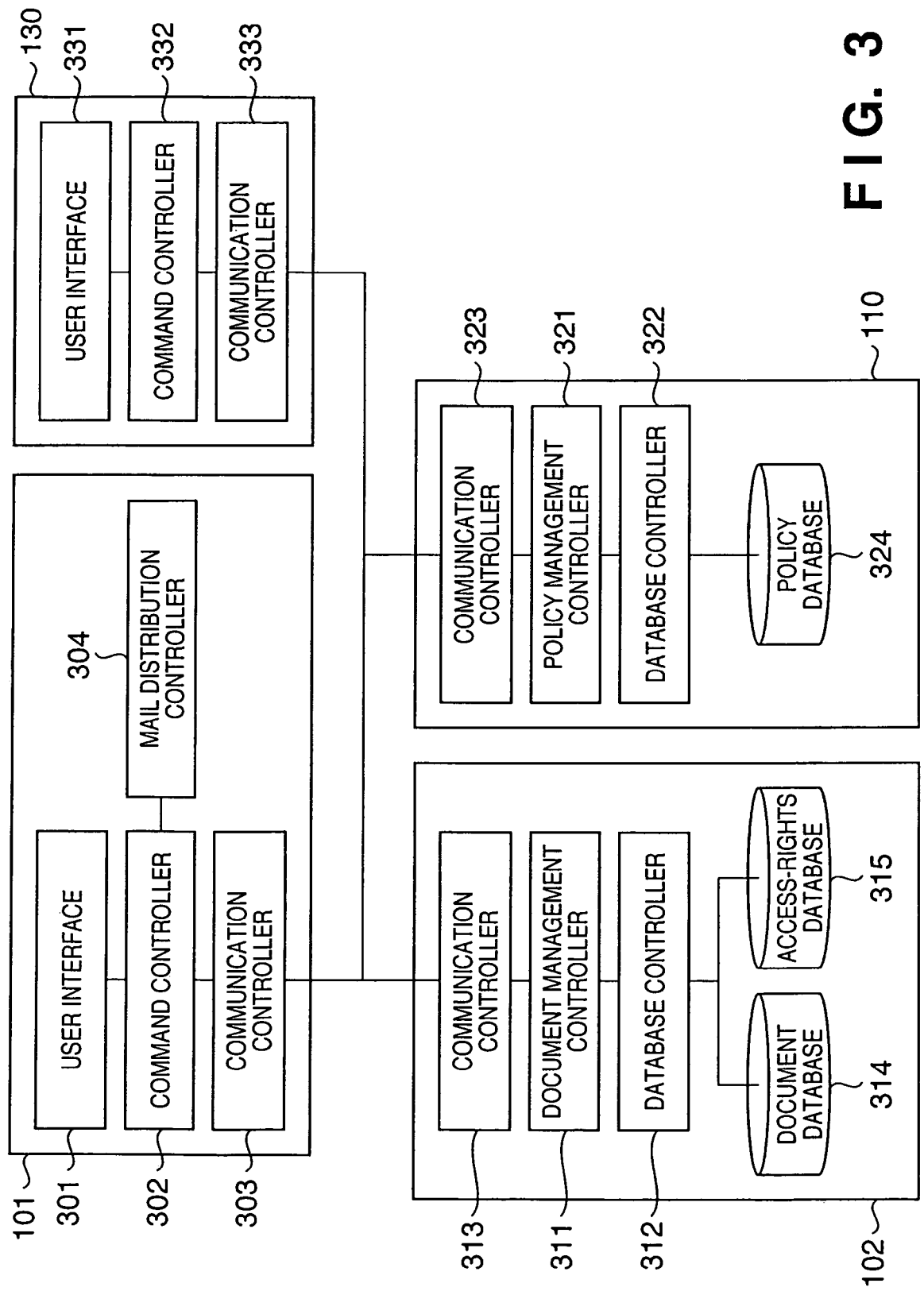
FIG. 3 is an exemplary functional block diagram of an information distribution system according to this embodiment.

FIG. 3 is an exemplary functional block diagram of an information distribution system according to this embodiment. Described below are functions implemented by executing several computer programs of this embodiment using the computers 200.

The DMS client 101 will be described first. A user interface 301 is used to supply various information visually to the user of the DMS client 101 and to allow the user to input various information. It goes without saying that the user interface 301 operates in cooperation with the display unit 205 and console 206 in accordance with control exercised by the CPU 201.

A command controller 302 analyzes user indications (commands, etc.) entered through the user interface 301 and transmits these indications to a communication controller 303 and mail distribution controller 304. The command controller 302 outputs the result of execution of the command, etc., to the user interface 301.

The communication controller 303 is software for controlling a communication interface circuit 207. The communication controller 303 communicates with a DMS server 102 and policy server 110 in accordance with control exercised by the command controller 302. The mail distribution controller 304, which is a so-called mail client, is connected to the mail server 120 in accordance with an instruction from the command controller 302 and receives and transmits mail. The mail server 120 includes, for example, an SMTP server and a POP server.

The DMS server 102 will be described next. A document management controller 311 implements functions that lie at the heart of the DMS server 102. The document management controller 311 mainly processes requests, which are transmitted from the DMS client 101, for handling document files. For example, if the user has the right to access a document file that is the object of a handling request, the document management controller 311 allows the DMS client 101 of this user to access this document file.

A database controller 312 functions to control a document database 314 that stores document files and an access-rights database 315 that manages access rights granted to users. A communication controller 313 is software for controlling the communication interface circuit 207.

The policy server 110 will be described next. A policy management controller 321 functions mainly for processing policy-information acquisition requests and the like. A database controller 322 functions to control a policy database 324. A communication controller 323 functions to control the communication interface circuit 207. Policy information and the corresponding access-right information has been stored in the policy database 324.

The functions of the client 130 will be described next. A user interface 331 is used to supply various information visually to the user and to allow the user to input various information. It goes without saying that the user interface 331 operates in cooperation with the display unit 205 and console 206 in accordance with control exercised by the CPU 201.

A command controller 332 analyzes user indications entered through the user interface 331 and transmits these indications to a communication controller 333. The command controller 332 has a function for receiving policy information (e.g., policy ID and document ID, etc.) and a document file transmitted from the DMS client 101. By way of example, the function of the mail client may also be included in the command controller 332. Further the command controller 332 outputs the result of execution of the command, etc., to the user interface 331. The policy information may be embedded in the document file or may be separate from the document file.

The communication controller 333 is software for controlling the communication interface circuit 207. The communication controller 333 communicates with the mail server 120 and policy server 110 in accordance with control exercised by the command controller 332.

Figure 4:
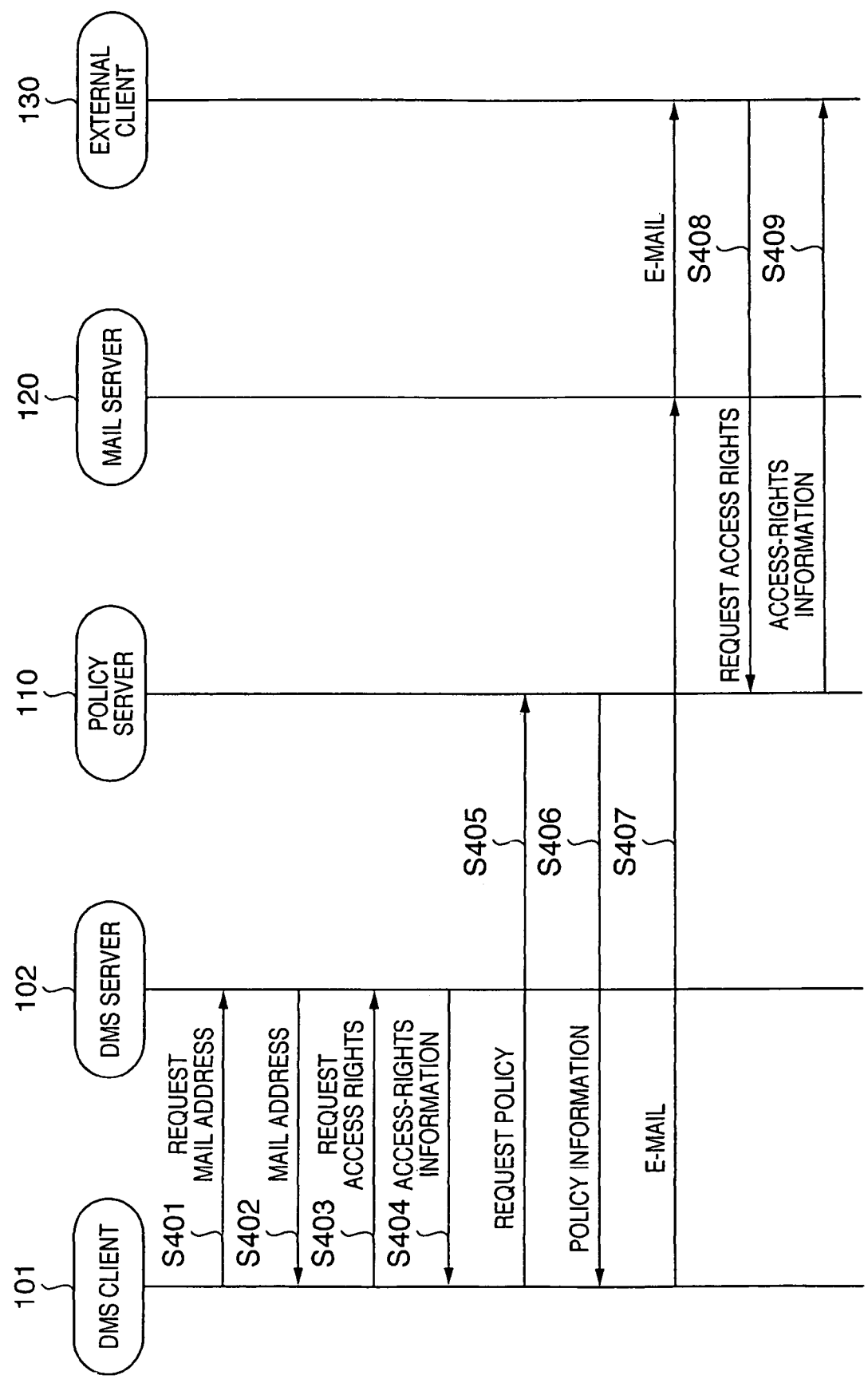
FIG. 4 is an exemplary sequence diagram of a document distribution method according to this embodiment.

FIG. 4 is an exemplary sequence diagram of a document distribution method according to this embodiment. This diagram will be used to describe the most typical document distribution method according to this embodiment.

At step S401 in FIG. 4, the DMS client 101 inputs the user ID of a recipient who is to receive a document file. At this time the DMS client 101 may acquire the mail address corresponding to the user ID from the DMS server 102. In such case the DMS server 102 transmits the mail address corresponding to the user ID to the DMS client 101 at step S402.

FIG. 5 is a diagram illustrating an example of a user management table for correlating and managing user IDs and mail addresses in this embodiment. This table may be implemented as part of the access-right database 315 or may be managed by separately providing a directory server. It should be noted that if this table is provided, the DMS client 101 will be able to acquire user IDs from mail addresses.

Next, at step S403, the DMS client 101 specifies the document ID of the document file that is to be transmitted and sends the DMS server 102 an access-right request that includes the document ID and the user ID of the recipient. Then, at step S404, the DMS server 102 acquires access-right information corresponding to the document ID and user ID from the access-right database 315 and transmits the access-right information to the DMS client 101.

FIG. 6 is a diagram illustrating an example of an access-right database according to this embodiment. As will be evident from FIG. 5, document IDs, user IDs and information relating to access right have been correlated and stored in the access-right database 315. A document ID is unique identification information that is specific to each document file. A user ID is unique identification information used to distinguish between each user managed by the DMS system. The information relating to access rights includes information as to whether reading (READ) is permitted, information as to whether writing (WRITE) is permitted, and information as to whether printing (PRINT) is permitted. By way of example, according to FIG. 6, a first user whose user ID is User0001 is capable of reading and printing a first document file whose document ID is Doc0001. The first user, however, is prohibited from rewriting the first document. On the other hand, a second user whose user ID is User0002 is permitted to subject the first document file to all of these operations.

At step S405, the DMS client 101 creates a policy request that includes information relating to the received information relating to the access right and transmits this request to the policy server 110. The policy request may include the user ID of the recipient and the document ID.

At step S406, the policy server 110 sends the DMS client 101 policy information that corresponds to the received information relating to the access rights. Here "corresponding policy information" is preferably defined by policy information in which access rights which are precisely the same as the access rights that the policy server 110 has received from the DMS client 101. However, "corresponding policy information" may also be similar policy information. For example, the policy server 110 determines whether a user ID and information relating to access rights have been stored in the policy database 324. If these are found, the policy server 110 reads the corresponding policy ID out of the policy database 324. If these are not found, however, then the policy server 110 issues a policy ID anew and registers the user ID and information relating to access rights in the policy database 324. The policy server 110 then transmits the read policy ID to the DMS client 101. In a case where a document ID is managed instead of the policy ID, the policy server 110 transmits the document ID to the DMS client 101 as policy information.

FIG. 7 is a diagram illustrating an example of a policy database according to this embodiment. A policy ID is a piece of information which uniquely identifies a policy in order to allow management of each policy. In FIG. 7, it should be noted that user IDs within the DMS system and user IDs in the policy server 110 coincide. In actuality, however it is rare for both of these to match. Accordingly, a directory server which manages the corresponding relationship between user IDs within the DMS system and user IDs within the policy server 110 may be separately provided. Alternatively, the DMS server 102 or policy server 110 may be internally provided with a function for managing the relationship between corresponding user IDs within the DMS system and user IDs within the policy server 110.

At step S407 in FIG. 4, the DMS client 101 appends the received policy ID to the document file to be transmitted and transmits this document file upon attaching it to E-mail. The E-mail is transferred to the client 130.through the mail server 120, etc. It should be noted that the document file to be transmitted and to which the policy ID has been appended may be written to a storage medium by the DMS client 101. In this case the storage medium would be physically shipped to the recipient.

Next, at step S408, the client 130 receives the document file or reads it out of the storage medium. Furthermore, the client 130 reads the policy ID from the document file and sends the policy server 110 an access-right request which contains the policy ID and the user ID of the recipient.

Finally, at step S409, the policy server 110 reads the received access-right-related information policy ID and user ID out of the policy database 324. The policy server 110 then transmits the access-right-related information to the client 130 at the distribution destination. The latter accesses the document file in accordance with the access-right-related information which it has received. For example, if the access-right-related information permits all of reading, writing and printing, then the client 130 at the distribution destination executes all of this processing.

Figure 8:
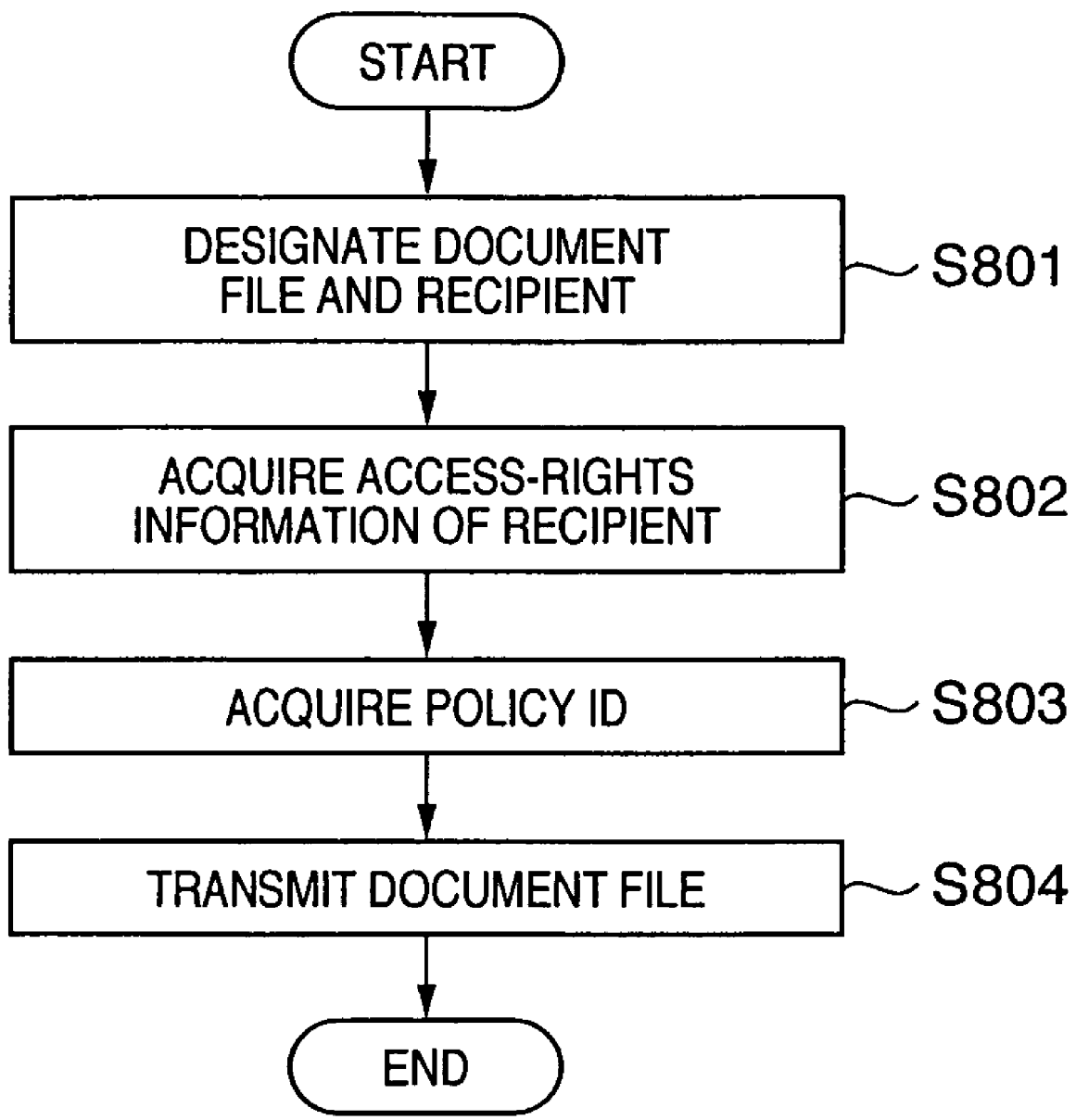
FIG. 8 is an exemplary flowchart of processing executed by a DMS client according to this embodiment.

FIG. 8 is an exemplary flowchart illustrating the processing executed by the DMS client 101 according to this embodiment. The computer program for implementing the DMS client indicates each of the processing steps executed by the CPU 201.

At step S801 in FIG. 8, the command controller 302 accepts designation of a document file to be transmitted and the user ID of the recipient through the user interface 301. The command controller 302 may acquire the mail address corresponding to the user ID from the DMS server 102. Further, in a case where the mail address has been input through the user interface 301, the command controller 302 may query the DMS server 102 with regard to the corresponding user ID and thus acquire this user ID.

Next, at step S802, the command controller 302 specifies the document ID of the document file to be transmitted and transmits an access-right request, which contains the document ID and user ID of the recipient, to the DMS server 102 through the communication controller 303. A document ID is unique identifying piece of information identifying each document file. Further, the document ID may be embedded in the document file or may be managed by being correlated with the document path (inclusive of file name) in the document database 314.

This is followed by step S803, in which the command controller 302 transmits a policy request, which contains access-right-related information received from the DMS server 102, to the policy server 110 via the communication controller 303. Further, the command controller 302 receives the policy ID from the policy server 110.

Next, at step S804, the command controller 302 transmits the document file to the recipient together with the policy ID. For example, the command controller 302 controls the mail distribution controller 304 and transmits the document file upon attaching it to the E-mail to which the mail address of the recipient has been appended as the destination. It should be noted that the policy ID may be stored in the document file.

Figure 9:
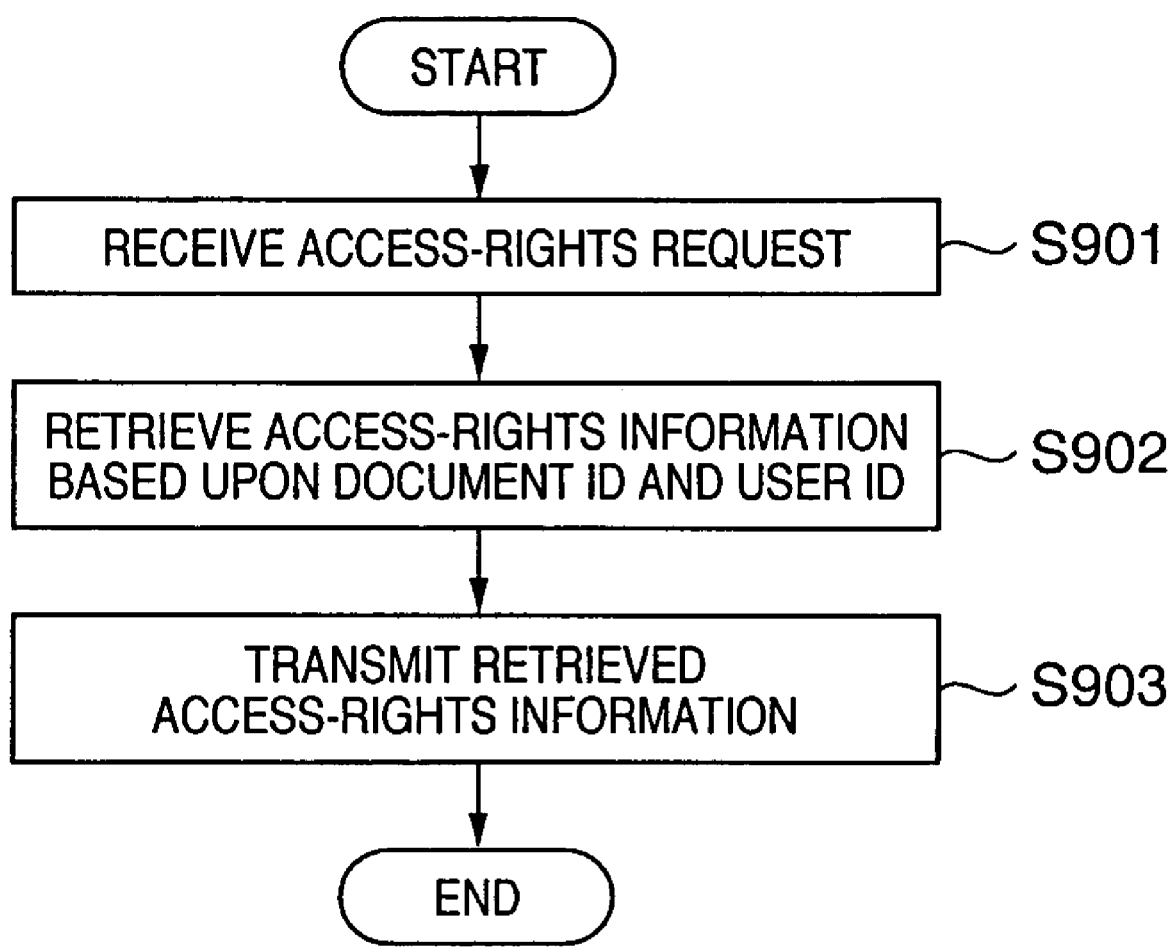
FIG. 9 is an exemplary flowchart illustrating the processing of a DMS server according to this embodiment.

FIG. 9 is an exemplary flowchart illustrating the processing of the DMS server according to this embodiment. The computer program for implementing the DMS server indicates each of the processing steps executed by the CPU 201.

At step S901 in FIG. 9, the document management controller 311 receives an access-right request from the DMS client 101 through the communication controller 313. Next, at step S902, the document management controller 311 reads the document ID and user ID from the request and transmits a query, which is for searching for the corresponding access-right information, to the database controller 312. In accordance with this query, the database controller 312 retrieves the access-right information corresponding to the document ID and user ID from the access-right database 315. Then, at step S903, the document management controller 311 receives the retrieved access-right information from the database controller 312 and transmits this information to the DMS client 101.

Figure 10:
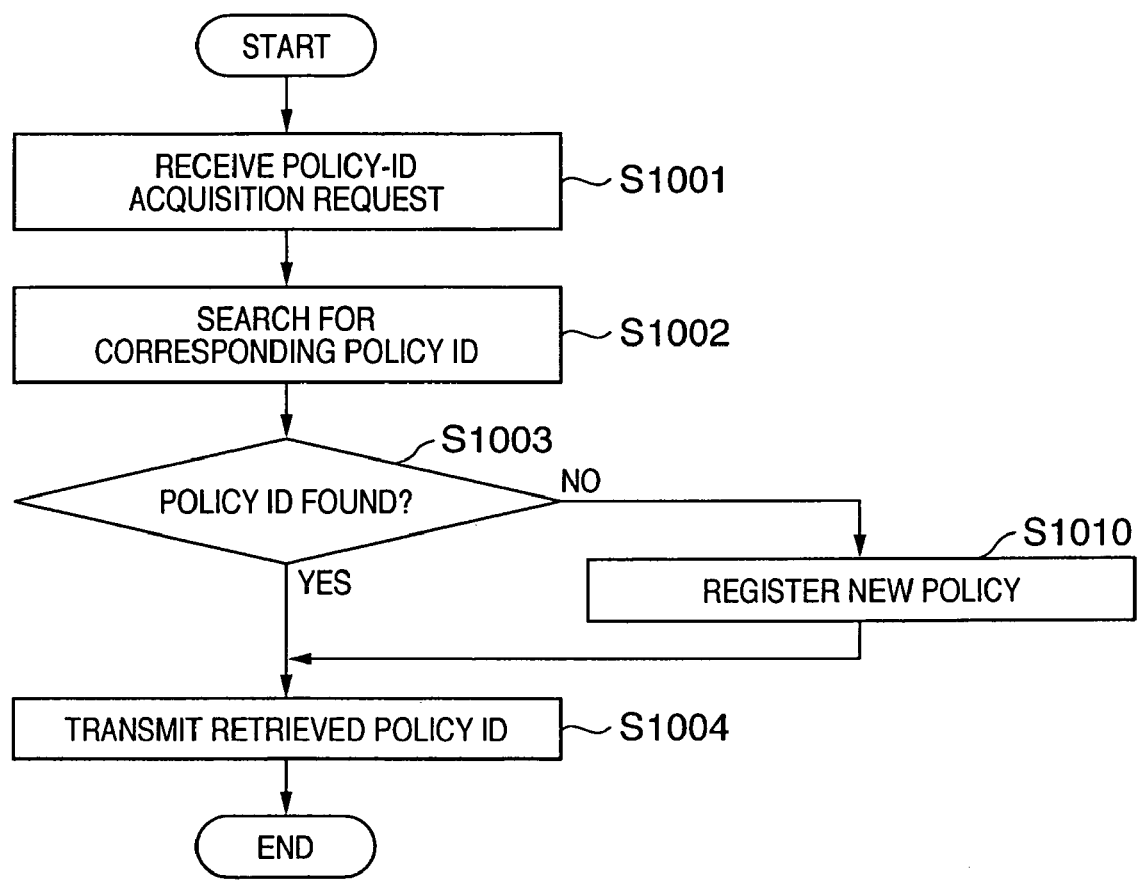
FIG. 10 is an exemplary flowchart illustrating processing by a policy server according to this embodiment.

FIG. 10 is an exemplary flowchart illustrating the processing executed by the policy server according to this embodiment. The computer program for implementing the policy server specifies each of the processing steps executed by the CPU 201.

At step S1001 in FIG. 10, the policy management controller 321 receives a policy-ID acquisition request from the DMS client 101 through the communication controller 323. This is followed by step S1002, at which the policy management controller 321 searches the policy database 324 through the database controller 322 for the policy ID corresponding to the user ID contained in the request and the access-right-related information. Next, at step S1003, the policy management controller 321 determines whether the corresponding policy ID has been stored (retrieved) in the policy database 324. If the corresponding policy ID exists, control proceeds to step S1004. Here the policy management controller 321 transmits the extracted policy ID to the DMS client 101. If the corresponding policy ID does not exist, however, control proceeds to step S1010.

At step S1010, the policy management controller 321 issues a policy ID anew and registers this in the policy database 324 in correlation with the received user ID and access-right-related information. Control then proceeds to step S1004.

FIG. 11 is a flowchart illustrating processing by a client at a distribution destination in this embodiment. The computer program for implementing the client 130 specifies each of the processing steps executed by the CPU 201.

At step S1101 in FIG. 11, the command controller 332 receives a document file through the communication controller 333. In a case where the document file is transported through a recording medium, the command controller 332 reads the document file of interest from the recording medium, which has been placed in a drive for the medium.

Next, at step S1102, the command controller 332 reads the policy ID from the document file. This is followed by step S1103, at which the command controller 332 sends the policy server 110 an acquisition request which contains the user ID of the operator of the client 130 (the recipient) and the policy ID. The command controller 332 receives the access-right-related information from the policy server 110 through the communication controller 333.

Next, at step S1104, the command controller 332 executes operations (e.g., read, write, print, etc.) with respect to the document file in accordance with the received access rights.

In accordance with this embodiment, as described above, policy information (e.g., policy ID, document ID, etc.) corresponding to the right to access a document file within the DMS 100 can be transmitted upon being appended to the document file. As a result, an advantage of the embodiment is that even though the document file has been transmitted by E-mail, an access right equivalent to that within the DMS 100 can be maintained.

More specifically, the client 130 of the recipient is connected to the policy server 110 based upon the received policy information, thereby making it possible to process a document file upon acquiring access rights equivalent to the access rights within the DMS 100.

It should be noted that the policy database 324 stores policy information corresponding to information (e.g., user ID), which concerns the recipient of a document file, and to the access rights of the recipient within the DMS 100. As a result, even if a document file has been transmitted to a point external to the DMS 100, the policy server 110 can apply access rights, equivalent to those within the DMS 100, to the client 130.

Further, in a case where a document file is transmitted upon being attached to an E-mail, information concerning the recipient of the document file may be adopted as the E-mail address of the recipient. Since an E-mail address is unique identification information, it can be adopted as a user ID. In this case an advantage obtained is that a user ID within the document management system 100 and a user ID of the policy server 110 may be combined with ease.

Further, the DMS client 101 is capable of acquiring a document-file access right, which is possessed by the recipient, by querying the DMS server 102. It should be noted that if the access rights to a document file should be changed, the DMS 100 may also cause the policy server 110 to change the policy information of the document file in such a manner that it will correspond to the access rights which prevail after the change. In other words, the policy server 110 receives a change request, which includes the document ID, user ID and information relating to access rights after the change, from the DMS server 102. The policy server 110 extracts the policy ID that has been correlated with the user ID and document ID and changes the access-right information that has been correlated with this policy ID. As a result, access rights can be changed even with regard to a document file that has already been distributed.

Other Embodiments

In the embodiment described above, a policy ID is appended to a document file. However, a policy ID need not necessarily be appended to a document file directly. For example, a document ID may be used instead of a policy ID. In such a case, however, it is necessary that the corresponding relationship among the document ID, user ID and policy (access-right information) be stored in the policy database 324 beforehand. The client 130 reads the document ID out of the document file and transmits it to the policy server 110 together with the user ID of the recipient. The policy server 110 extracts the access-right information corresponding to the document ID and user ID from the policy database 324 and transmits it to the client 130. It should be noted that in this case, the document ID would function as policy information instead of the policy ID.

Multiple users may receive a document file. In such a case, each item of policy information is acquired in accordance with the user ID of each recipient. Further, the client 130 of each recipient transmits the respective policy information (e.g., document ID or policy ID) and its own user ID to the policy server 110, as a result of which the client can acquire its own access-right information.

Further, in the embodiment set forth above, it is described that the DMS client 101 transmits E-mail. However, the mail transmitting function may be installed in the DMS server 102. That is, the DMS client 101 may send the DMS server 102 the destination address of E-mail (the mail address or user ID of the recipient) and information concerning the path of a document file. The DMS server 102 may acquire access-right information internally and acquire the policy information by querying the policy server 110. That is, the DMS server 102 rather than the DMS client 101 may execute almost all of the processing (S802 to S804) illustrated in FIG. 8.

Further, in the embodiment set forth above, it is described that a document file is distributed by E-mail transmission. However, another file transfer protocol, e.g., FTP (File Transfer Protocol) or SMB (Service Message Block), may be used. In this case, instead of providing the user management table of FIG. 5 that correlates and manages user IDs and mail addresses, it would suffice to provide a user management table that correlates and manages user IDs and machine names or IP addresses of the transfer destinations.

It should be noted that the client 130, for example, is capable of being connected to the policy server 110 based upon the URL address of the policy server 110 which has been embedded in a document file. Furthermore, the URL address of the policy server 110 may be ascertained beforehand by the client 130 or may be included as part of the policy information.

The object of the invention is attained also by supplying a software program, which implements the functions of the foregoing embodiments, directly or remotely to a system or apparatus, reading the supplied program codes with a computer of the system or apparatus, and then executing the program codes.

Accordingly, since the functions and processes of the present invention are implemented by computer, the program codes per se installed in the computer also implement the present invention. In other words, a computer program that is for the purpose of implementing the functions and processes set forth above is itself one aspect of the present invention.

In this case, so long as the system or apparatus has the functions of the program, the form of the program, e.g., object code, a program executed by an interpreter or script data supplied to an operating system, etc., does not matter.

Examples of recording media that can be used for supplying the program are a flexible disk, hard disk, optical disk, magneto-optical disk, CD-ROM, CD-R and CD-RW. Further examples of recording media are magnetic tape, a non-volatile type memory Card, ROM and DVD (DVD-ROM, DVD-R), etc.

Further, the program may be downloaded from a website on the Internet using the browser of the client computer. That is, the computer program per se of the present invention or an automatically installable compressed file of the program may be downloaded to a recording medium such as a hard disk. Further, the program of the present invention can be supplied by dividing the program code constituting the program into a plurality of files and downloading the files from different websites. In other words, there are cases where a WWW server, which allows multiple users to download, the program files that implement the functions and processes of the present invention by computer, is also a structural requisite of the present invention.

Further, it is also permissible to encrypt and store the program of the present invention on a storage medium such as a CD-ROM and distribute the storage medium to users. In this case, only users who meet certain requirements are allowed to download decryption key information from a website via the Internet and to run the encrypted program upon decrypting it using the key information, whereby the program is installed in the computer.

Further, the functions of the embodiments may be implemented by having a computer execute a program that has been read. It should be noted that an operating system or the like running on the computer may perform all or a part of the actual processing based upon the indications of the program. The functions of the embodiments can be implemented in this case as well.

Furthermore, the program read from a recording medium may be written to a memory provided on a function expansion board inserted into the computer or provided in a function expansion unit connected to the computer, and a CPU or the like mounted on the function expansion board or function expansion unit may perform all or a part of the actual processing. The functions of the embodiments may thus be implemented.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Application No. 2005-243062, filed Aug. 24, 2005, which is hereby incorporated by reference herein in its entirety.

What is claimed is:

1. A document distribution system for distributing a document file, comprising:
   a document management system including a document management server and a document management client; and
   a policy server external to the document management system, the policy server including a processor and a memory coupled to the processor,
   wherein the document management server stores the document file to be accessed by the document management client and manages a first access right of the document file,
   wherein the policy server manages a second access right of the document file, and also manages policy information specifying the second access right,
   wherein the first access right is an access right for a recipient of the document file to access the document file within the document management system, and
   wherein the second access right is an access right for the recipient to access the document file at a device external to the document management system;
   the document management client comprising:
   a transmitting unit for transmitting the document file accessed by the document management client to the device external to the document management system;
   a first acquisition unit for acquiring the first access right managed by the document management server; and
   a second acquisition unit for acquiring policy information from the policy server, wherein the second access right corresponds to the first access right acquired by the first acquisition unit;
   wherein the transmitting unit adds the policy information to the document file, and transmits the document file added with the policy information to the device external to the document management system, and
   wherein the device external to the document management system is connected to the policy server based upon the policy information which is transmitted by the transmitting unit, whereby the device external to the document management system acquires the second access right equivalent to the first access right in the document management system with regard to the document file and processes the document file.

2. The document distribution system according to claim 1, wherein the policy server includes a policy database for storing the policy information.

3. The document distribution system according to claim 2, wherein the policy information corresponds to information concerning the recipient of the document file, and is any of an E-mail address of the recipient, a user ID of the recipient in the document management system or a user ID of the recipient being managed by the policy database.

4. The document distribution system according to claim 2, wherein the second acquisition unit includes a query unit for querying the document management server, with regard to information concerning the right of the recipient to access the document file.

5. The document distribution system according to claim 1, wherein if the first access right changes, then the second access right relating to the document file is also changed correspondingly in the policy server.

6. A document management client included in a document management system with a document management server for storing a document file to be accessed by the document management client and for managing a first access right of the document file, the document management client comprising:
   a processor;
   a memory coupled to the processor;
   a transmitting unit for transmitting the document file accessed by the document management client to a device external to the document management system;
   a first acquisition unit for acquiring the first access right managed by the document management server, wherein the acquired first access right is an access right for a recipient of the document file to be transmitted to access the document file within the document management system;

a second acquisition unit for acquiring policy information from a policy server for managing a second access right of the document file, and for also managing the policy information specifying the second access right, and the second access right corresponds to the first access right acquired by the first acquisition unit, wherein the second access right is an access right for the recipient to access the transmitted document file at the device external to the document management system;

wherein the transmitting unit adds the policy information to the document file, and transmits the document file added with the policy information to the device external to the document management system, and wherein the device external to the document management system is connected to the policy server based upon the transmitted policy information, whereby the device external to the document management system acquires the second access right equivalent to the first access right in the document management system with regard to the document file and processes the document file.

7. A document management method performed in a document management client included in a document management system with a document management server for storing a document file to be accessed by the document management client and for managing a first access right of the document file, the method comprising:

using a processor to perform the following steps:

obtaining the document file from the document management server to be transmitted to a device external to the document management system;

acquiring the first access right managed by the document management server, wherein the acquired first access right is an access right for a recipient of the document file to be transmitted to access the transmitted document file within the document management system;

acquiring policy information from a policy server for managing a second access right of the document file, and for also managing the policy information specifying the second access right, and the second access right corresponds to the first access right acquired by the first acquisition unit, wherein the second access right is an access right for the recipient to access the transmitted document file at the device external to the document management system;

adding the policy information to the document file; and transmitting the document file added with the policy information to the device external to the document management system, wherein the device external to the document management system is connected to the policy server based upon the transmitted policy information, whereby the device external to the document management system acquires the second access right equivalent to the first access right in the document management system with regard to the document file and processes the document file.

8. A non-transitory computer readable storage medium storing a computer-executable program executed on a document management client included in a document management system with a document management server for storing a document file to be accessed by the document management client and for managing a first access right, the computer-executable program causing the client to perform the following steps:

obtaining the document file from the document management server to be transmitted to a device external to the document management system;

acquiring the first access right managed by the document management server, wherein the acquired first access right is an access right for a recipient of the document file to be transmitted to access the transmitted document file within the document management system;

acquiring policy information from a policy server for managing a second access right of the document file, and for also managing the policy information specifying the second access right, and the second access right corresponds to the first access right acquired by the first acquisition unit, wherein the second access right is an access right for the recipient to access the transmitted document file at the device external to the document management system;

adding the policy information to the document file; and transmitting the document file added with the policy information to the device external to the document management system, wherein the device external to the document management system is connected to the policy server based upon the transmitted policy information, whereby the device external to the document management system acquires the second access right equivalent to the first access right in the document management system with regard to the document file and processes the document file.

* * * * *